US008544001B2

(12) United States Patent
Gagner et al.

(10) Patent No.: US 8,544,001 B2

(45) Date of Patent: Sep. 24, 2013

(54) GAMING SOFTWARE PROVIDING OPERATING SYSTEM INDEPENDENCE

(75) Inventors: Mark B. Gagner, West Chicago, IL (US); Matthew J. Ward, Northbrook, IL (US)

(73) Assignee: WMS Gaming Inc., Waukegan, IL (US)

( * ) Notice: Subject to any disclaimer, the term of this patent is extended or adjusted under 35 U.S.C. 154(b) by 1656 days.

(21) Appl. No.: 11/570,407

(22) PCT Filed: Jun. 15, 2005

(86) PCT No.: PCT/US2005/021144

§ 371 (c)(1), (2), (4) Date: Dec. 11, 2006

(87) PCT Pub. No.: WO2006/002084

PCT Pub. Date: Jan. 5, 2006

(65) Prior Publication Data

US 2008/0082985 A1 Apr. 3, 2008

Related U.S. Application Data

(60) Provisional application No. 60/579,828, filed on Jun. 15, 2004.

(51) Int. Cl.
*A63F 13/00* (2006.01)
*G06F 9/455* (2006.01)

(52) U.S. Cl.
USPC .................... 718/1; 463/42; 463/43; 719/313

(58) Field of Classification Search
CPC ............ G07F 17/3227; G07F 17/3223; A63F 2300/209
USPC .......................... 718/1; 719/313; 463/42, 43
See application file for complete search history.

(56) References Cited

U.S. PATENT DOCUMENTS 6,036,601 A * 3/2000 Heckel .......................... 463/42
6,385,567 B1 * 5/2002 Lew et al. ...................... 703/27

(Continued)

FOREIGN PATENT DOCUMENTS

WO WO-2006002084 A1 1/2006
WO WO-2008156809 A1 12/2008

OTHER PUBLICATIONS

Shuffl Master Gaming, "Game Operating System 'SGOS' Developer's Manual" (Apr. 10, 2003) [retrieved from file of PG. Pub. 2003/0069074].*

(Continued)

*Primary Examiner* — H S Sough
*Assistant Examiner* — Brian W Wathen
(74) *Attorney, Agent, or Firm* — Schwegman Lundberg & Woessner, P.A.

(57) ABSTRACT

Systems and methods provide a gaming machine and server framework environment that is operating system independent. One aspect of the systems and methods includes providing a set of framework components that present a common interface regardless of the underlying operating system used on the gaming machine or server. A further aspect of the systems and methods include various plug-in services (320) that use the framework (302) to communicate and interact with one another. A still further aspect includes providing an emulator providing the ability for a gaming application or service designed for one operating system to be run on different operating system.

23 Claims, 8 Drawing Sheets

(56) References Cited

U.S. PATENT DOCUMENTS

| | | | | |
|---|---|---|---|---|
| 6,805,634 | B1 * | 10/2004 | Wells et al. | 463/42 |
| 7,785,204 | B2 * | 8/2010 | Wells et al. | 463/42 |
| 2002/0052727 | A1 * | 5/2002 | Bond et al. | 703/26 |
| 2003/0069074 | A1 * | 4/2003 | Jackson | 463/43 |
| 2003/0216182 | A1 * | 11/2003 | Gauselmann | 463/40 |
| 2003/0224858 | A1 * | 12/2003 | Yoseloff et al. | 463/43 |
| 2003/0228912 | A1 * | 12/2003 | Wells et al. | 463/43 |
| 2004/0014526 | A1 | 1/2004 | Kulas | |
| 2004/0038740 | A1 * | 2/2004 | Muir | 463/40 |
| 2004/0198479 | A1 * | 10/2004 | Martinek et al. | 463/1 |
| 2005/0113172 | A1 * | 5/2005 | Gong | 463/42 |
| 2006/0035707 | A1 | 2/2006 | Nguyen et al. | |
| 2007/0112714 | A1 | 5/2007 | Fairweather | |
| 2007/0135216 | A1 | 6/2007 | Martinek et al. | |
| 2008/0070688 | A1 | 3/2008 | Loehrer | |
| 2008/0076573 | A1 | 3/2008 | Loehrer | |
| 2008/0082985 | A1 | 4/2008 | Gagner et al. | |
| 2009/0325686 | A1 | 12/2009 | Davis et al. | |
| 2010/0190553 | A1 | 7/2010 | Buchholz et al. | |

OTHER PUBLICATIONS

Singh, A., "An Introduction to Virtualization" (Jan. 2004), pp. 1-26 [retrieved from http://www.kernelthread.com/publications/virtualization/ on Nov. 15, 2011].*

Pouech et al., "Wine Developer's Guide" (Mar. 4, 2004) [retrieved from file of US Pat. No. 7,810,092, originally retrieved from www.winehq.org].*

Harvey, M., "Multithreading—The Delphi Way", version 1.1, (Sep. 16, 2000) [retrieved from http://www.eonclash.com/Tutorials/Multithreading/MartinHarvey1.1/ToC.html on Nov. 16, 2011].*

Snyder, S., "thread-util.ps" (Jun. 11, 2000) [retrieved from http://www-d0.fnal.gov/~snyder/online/thread-util.ps. on Nov. 16, 2011].*

Gardner et al. "Wine FAQ" (1998) [retrieved from file of US Pat. No. 7,810,092, originally retrieved from www.winehq.org].*

"Winelib User's Guide" (Mar. 4, 2004) [retrieved from file of US Pat. No. 7,810,092, originally retrieved from www.winehq.org].*

Sheets et al., "Wine User Guide" (Mar. 4, 2004) [retrieved from file of US Pat. No. 7,810,092, originally retrieved from www.winehq.org].*

"International Search Report for Application No. PCT/US2005/021144, date mailed Nov. 3 2005", 5 pgs.

"Written Opinion of the International Searching Authority for Application No. PCT/ US2005/021144, date mailed Nov. 3, 2005", 3 pgs.

"U.S. Appl. No. 12/665,162, Examiner's Amendment mailed Mar. 26, 2012", 3 pgs.

"U.S. Appl. No. 12/665,162, Final Office Action mailed Nov. 3, 2011", 5 pgs.

"U.S. Appl. No. 12/665,162, Non Final Office Action mailed Jun. 20, 2011", 10 pgs.

"U.S. Appl. No. 12/665,162, Non Final Office Action mailed Jul. 3, 2012", 7 pgs.

"U.S. Appl. No. 12/665,162, Notice of Allowance mailed Feb. 15, 2012", 7 pgs.

"U.S. Appl. No. 12/665,162, Preliminary Amendment filed Dec. 17, 2009", 7 pgs.

"U.S. Appl. No. 12/665,162, Response filed Sep. 20, 2011 to Non Final Office Action mailed Jun. 20, 2011", 12 pgs.

"U.S. Appl. No. 12/665,162, Response filed Nov. 2, 2012 to Non Final Office Action mailed Jul. 3, 2012", 11 pgs.

"Australian U.S. Appl. No. 2008266787, First Examiners Report mailed Mar. 27, 2012", 3 pgs.

"International Application Serial No. PCT/US2008/07648, International Search Report and Written Opinion mailed Oct. 2, 2008", 11 pgs.

* cited by examiner

GAMING SOFTWARE PROVIDING OPERATING SYSTEM INDEPENDENCE

RELATED APPLICATIONS

This application is a U.S. National Stage Filing under 35 U.S.C. 371 from International Patent Application Serial No. PCT/US2005/021144, filed Jun. 15, 2005, and published on Jan. 5, 2006 as WO 2006/002084 A1, which claims the benefit of U.S. Provisional Application Ser. No. 60/579,828 filed Jun. 15, 2004, which applications are incorporated herein by reference.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2003, 2004, WMS Gaming, Inc. All Rights Reserved.

FIELD

The present invention relates generally to software for gaming machines, and more particularly to providing an environment for executing gaming machine software that is independent of the underlying operating system.

BACKGROUND

Today's gaming terminal typically comprises a computerized system controlling a video display or reels that provide wagering games such as slots, video card games (poker, blackjack etc.), video keno, video bingo, video pachinko and other games typical in the gaming industry. In past systems, the software controlling the computerized system has been primarily proprietary software, including both the operating system and gaming software.

In previous systems, the gaming terminal software has been provided as a single monolithic system. That is, all of the software is built and provided as a single product or unit. This manner of providing gaming software can lead to several problems.

For example, one problem is that different jurisdictions (e.g. nations, states, provinces etc.) have varying rules that are enforced with respect to gaming. Accommodating each jurisdiction's rules in previous systems becomes more and more complex as time goes on.

Additionally, there has been a trend in recent times towards the acceptance by regulatory bodies and the gaming industry of networking game machines and gaming components. Such networking of game machines increases the desirability of providing modular gaming machine components rather than single monolithic gaming systems because modular components are more efficiently managed and delivered over a network.

Furthermore, gaming systems are now being run on a variety of different operating systems. For example, a central server for a gaming establishment may be running one operating system while the gaming machines run alternative and incompatible software. As a result, significant portions of the gaming software must typically be rewritten every time a new operating system is desired, or a new version of an operating system is released for the gaming system.

In view of the above mentioned problems and concerns, there is a need in the art for the present invention.

SUMMARY

The above-mentioned shortcomings, disadvantages and problems are addressed by the present invention, which will be understood by reading and studying the following specification.

Systems and methods provide a gaming machine and server framework environment that is operating system independent. One aspect of the systems and methods includes providing a set of framework components that present a common interface regardless of the underlying operating system used on the gaming machine or server. A further aspect of the systems and methods include various plug-in services that use the framework to communicate and interact with one another. A still further aspect includes providing an emulator providing the ability for a gaming application or service designed for one operating system to be run on different operating system.

The present invention describes systems, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

Figure 1:
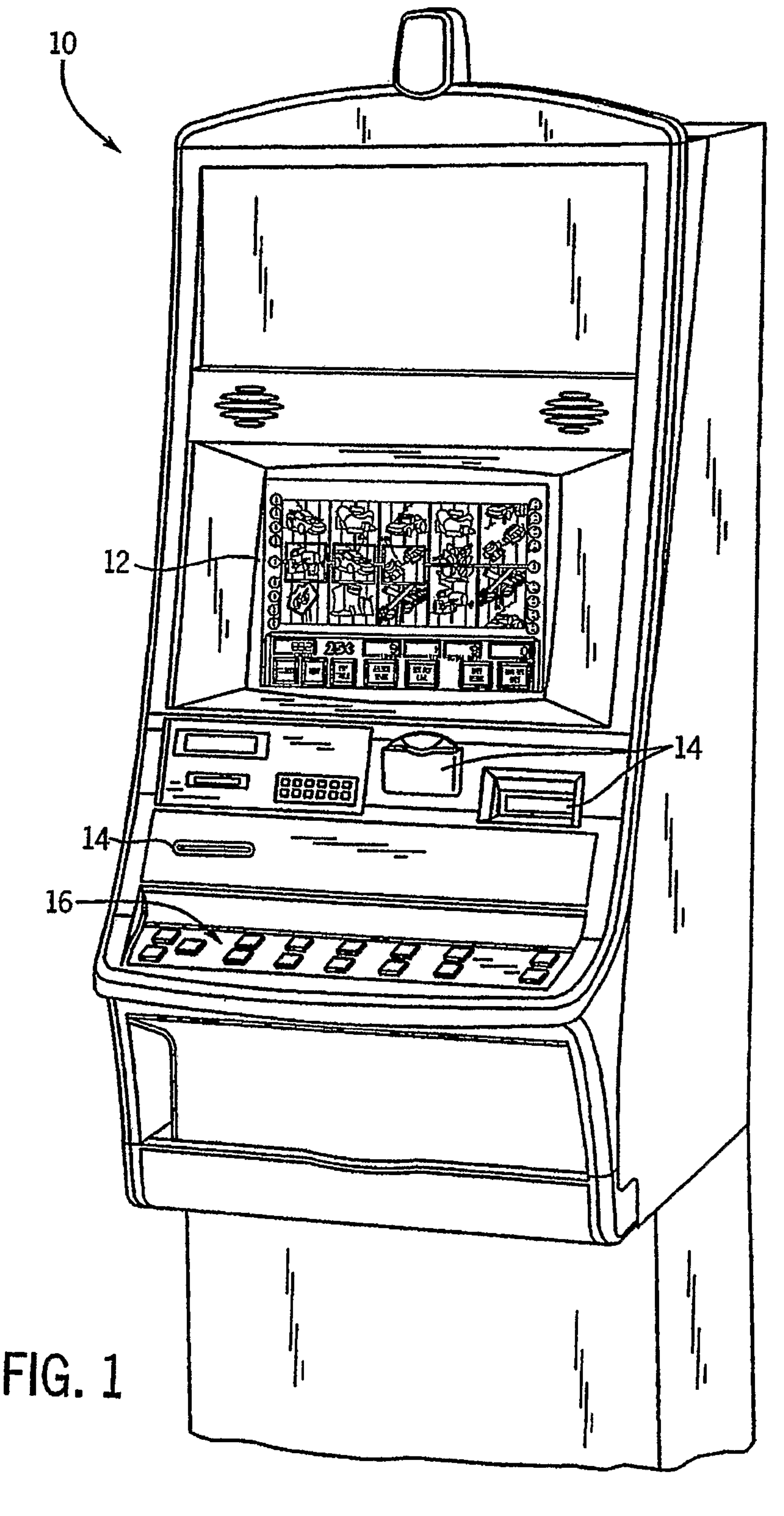
FIG. 1 is a perspective view of a gaming machine embodying the present invention.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The description of the various embodiments is to be construed as exemplary only and does not describe every possible instance of the invention. Numerous alternatives could be implemented, using combinations of current or future technologies, which would still fall within the scope of the claims. The following detailed description is, therefore, not to be taken in a limiting sense, and the scope of the present invention is defined only by the appended claims.

Operating Environment

FIG. 1 illustrates an exemplary gaming machine 10 in which embodiments of the invention may be implemented. In some embodiments, gaming machine 10 is operable to conduct a wagering game such as mechanical or video slots, poker, keno, bingo, or blackjack. If based in video, the gaming machine 10 includes a video display 12 such as a cathode ray tube (CRT), liquid crystal display (LCD), plasma, or other type of video display known in the art. A touch screen preferably overlies the display 12. In the illustrated embodiment, the gaming machine 10 is an "upright" version in which the display 12 is oriented vertically relative to a player. Alternatively, the gaming machine may be a "slant-top" version in which the display 12 is slanted at about a thirty-degree angle toward the player.

The gaming machine 10 includes a plurality of possible credit receiving mechanisms 14 for receiving credits to be used for placing wagers in the game. The credit receiving mechanisms 14 may, for example, include a coin acceptor, a bill acceptor, a ticket reader, and a card reader. The bill acceptor and the ticket reader may be combined into a single unit. The card reader may, for example, accept magnetic cards and smart (chip) cards coded with money or designating an account containing money.

In some embodiments, the gaming machine 10 includes a user interface comprising a plurality of push-buttons 16, the above-noted touch screen, and other possible devices. The plurality of push-buttons 16 may, for example, include one or more "bet" buttons for wagering, a "play" button for commencing play, a "collect" button for cashing out, a help" button for viewing a help screen, a "pay table" button for viewing the pay table(s), and a "call attendant" button for calling an attendant. Additional game specific buttons may be provided to facilitate play of the specific game executed on the machine. The touch screen may define touch keys for implementing many of the same functions as the push-buttons. Other possible user interface devices include a keyboard and a pointing device such as a mouse or trackball.

A processor controls operation of the gaming machine 10. In response to receiving a wager and a command to initiate play, the processor randomly selects a game outcome from a plurality of possible outcomes and causes the display 12 to depict indicia representative of the selected game outcome. In the case of slots for example mechanical or simulated slot reels are rotated and stopped to place symbols on the reels in visual association with one or more pay lines. If the selected outcome is one of the winning outcomes defined by a pay table, the CPU awards the player with a number of credits associated with the winning outcome.

Figure 2:
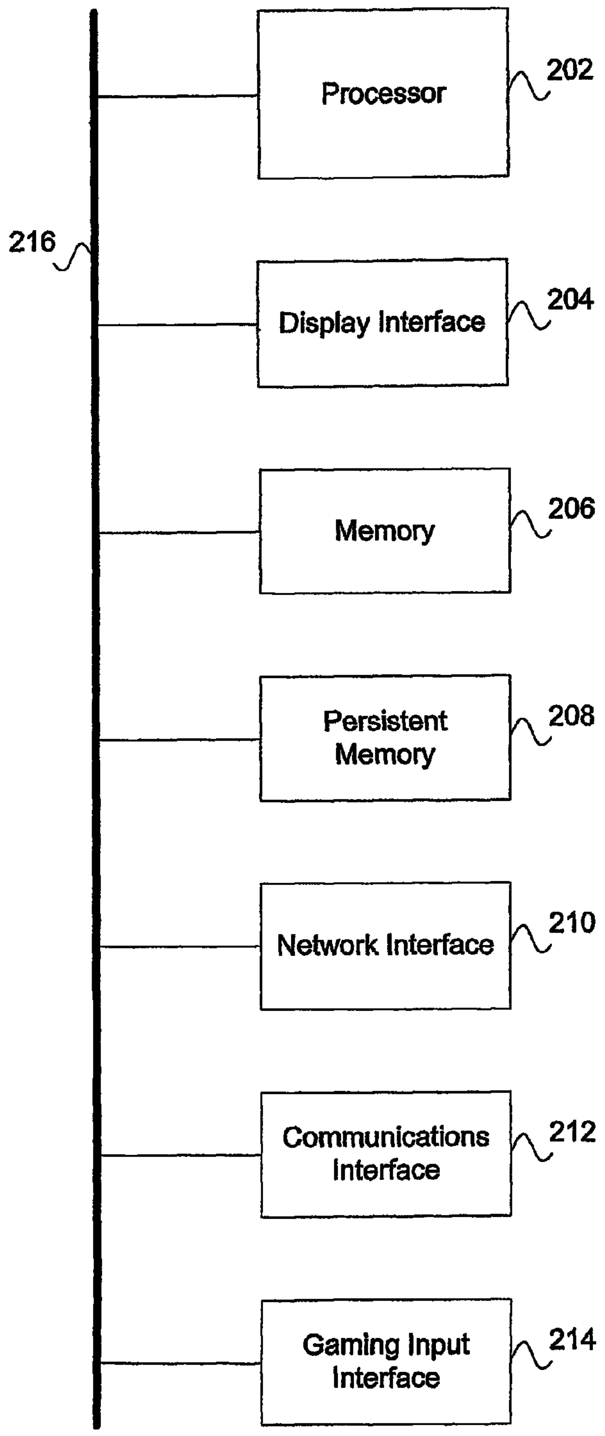
FIG. 2 is a block diagram of a gaming control system suitable for operating the gaming machine in FIG. 1.

FIG. 2 is a block diagram of a gaming control system suitable for controlling the operation of the gaming machine 10 in FIG. 1. In some embodiments of the invention, gaming control system includes one or more processors 202, one or more display interfaces 204, memory 206, persistent memory 208, network interface 210, communications interface 212, gaming input interface 214 all communicably coupled via a bus 216 Processor 202 executes operating system and gaming software stored in memories 206 and 208. In some embodiments, processor 202 may be a processor from the INTEL PENTIUM® family of processors, however the invention is not limited to any particular processor. Memory 206 may be a random-access memory capable of storing instructions and data used by an operating system and gaming application.

Persistent memory 208 is a memory that may be used to store operating system and gaming software for loading and execution by processor 202. Persistent memory 208 may be a ROM, a flash memory, a hard drive, a CD-ROM, DVD-ROM or other type of memory able to persistently store software and data.

Display interface 204 operates to control one or more displays such as display 12 of gaming machine 10.

Figure 3A:
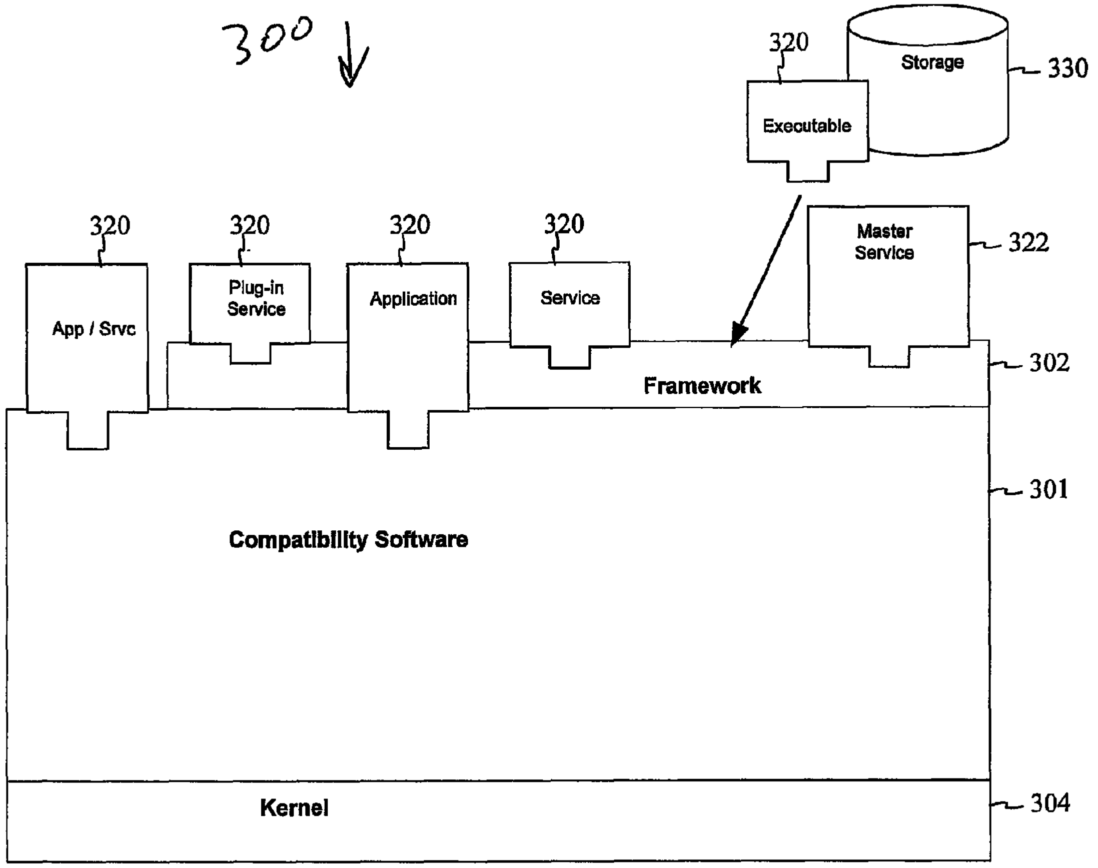
FIG. 3A is a block diagram of a software environment for a gaming device incorporated in varying embodiments of the invention.

FIG. 3A is a block diagram of a software environment 300 for a gaming device incorporated in varying embodiments of the invention. In some embodiments, the environment 300 includes a kernel 304, compatibility software 301, executables 320 and storage 330. Executable 320 may be any type of executable program, examples include applications, services, and plug-ins.

Operating system kernel 304 may be any of a variety of operating systems available for gaming machines and servers supporting gaming systems. Examples of such operating systems include the Microsoft Windows family of operating systems, the Linux operating system, versions and variants of the UNIX operating system, and other proprietary operating systems such as Integrity (e.g. with a Linux compatibility layer), VxWorks, QnX and Vertex operating systems. Those of skill in the art will appreciate that the concepts of the inventive subject matter may be incorporated in a variety of operating systems now known or developed in the future. Each of these operating systems typically provides interfaces that are specific to the operating system. For example, interfaces to file system functions, memory functions, timer functions etc. will be different depending on the specific operating system being run.

In some embodiments, compatibility software 301 provides a set of libraries, components and/or services that provide a mechanism for an executable 320 to be run on multiple types of kernels 304 regardless of the type or version of operating system kernel 304. Further details on these embodiments are provided below with reference to FIGS. 3B and 4. In alternative embodiments, compatibility software 301 provides a set of libraries, components and/or services that provide a mechanism for executing an application written and/or built for a different operating system kernel to execute than operating system kernel 304. Further details on these embodiments will be provided below with reference to FIGS. 3C and 3D. As illustrated in FIG. 3A, an executable 320 may interface to the compatibility component 301 directly, or through a framework 302. Additionally, an executable may utilize both methods concurrently, i.e. an executable may interface with compatibility component 301 both through framework 302 and through a direct interface to the compatibility component.

Executables 320, compatibility software 301, and operating system kernel 304 may be loaded from storage 330. Storage device 330 may be any type of storage device capable of persistently storing executable programs and data. Example of such devices include hard drives, CD-ROM drives, DVD-ROM drives, ROMs, EEPROMs, and flash memories, including compact flash memories. Additionally, storage 330 may be accessible over a network. The inventive subject matter is not limited to any particular type of storage device 330.

Figure 3B:
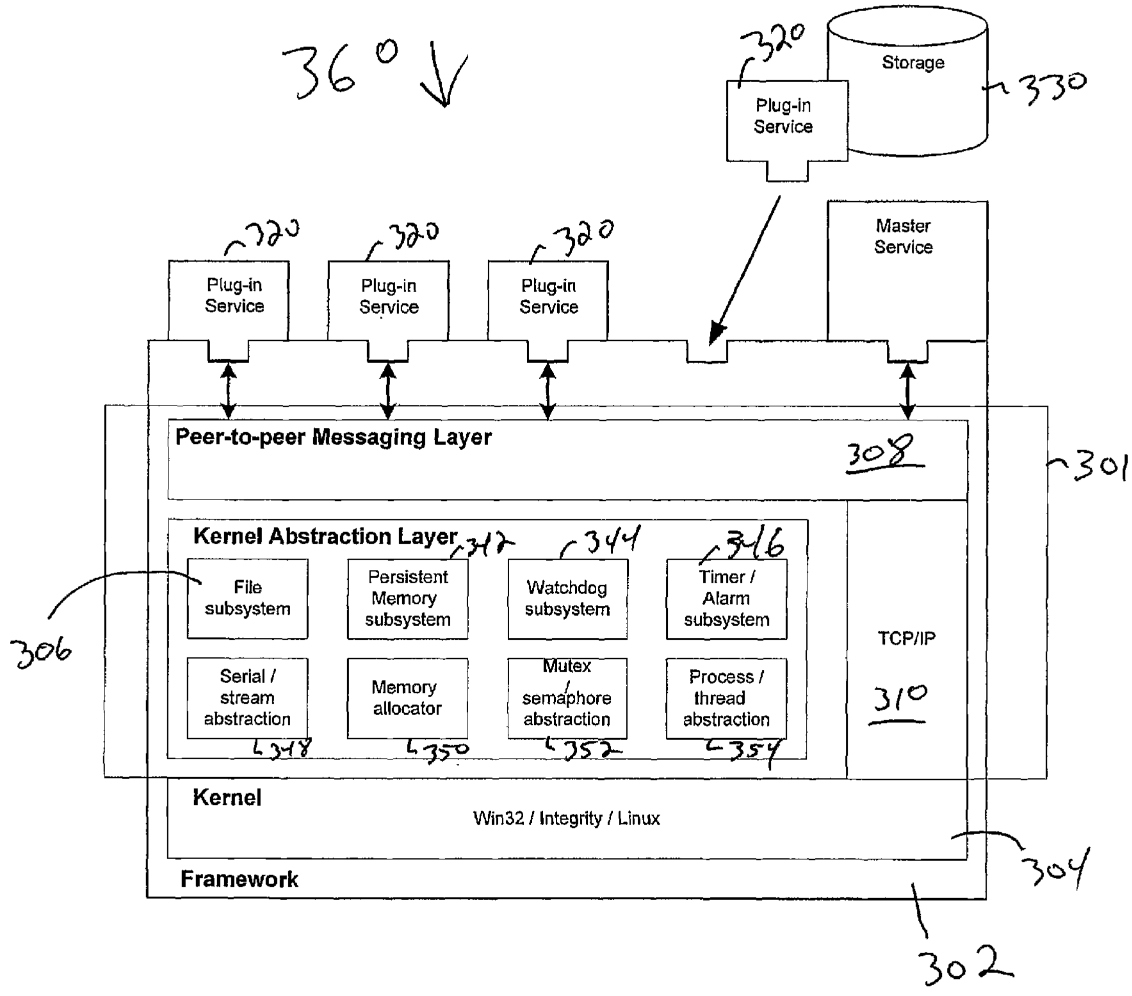
FIG. 3B is a block diagram of a compatibility component including a kernel abstraction component according to varying embodiments of the invention.

FIG. 3B is a block diagram of a software environment 360 for a gaming device incorporated in varying embodiments of the invention. The environment 360 includes a framework 302 available for use by various applications and plug-in services 320 and a master service. In some embodiments, framework 302 includes operating system kernel 304, kernel abstraction layer 306 and peer-to-peer messaging layer 308.

Kernel abstraction layer 306 provides a consistent set of interfaces to various components typically provided in an operating system kernel such as kernel 304. The interfaces provided by kernel abstraction layer 306 thus remain unchanged regardless of the operating system kernel in use by the framework. For example, the interfaces provided by kernel abstraction layer 306 are the same regardless of whether the framework is running a Microsoft Windows operating system, a Linux operating system, or a version of a UNIX based operating system, or any of the other operating systems mentioned above.

Varying embodiments of the invention may include interfaces for a file subsystem 306, persistent memory subsystem 342, watchdog subsystem 344, timer/alarm subsystem 346, serial/stream subsystem 348, memory allocator subsystem 350, mutex/semaphore subsystem 352 and process/thread subsystem 354. It should be noted that various embodiments of the invention may include any combination of one or more the above-mentioned subsystems, no embodiment of the invention need incorporate all of the subsystems. Further, it should be noted that it is desirable to include functionality common across most operating systems while maintaining compatibility with real-time versions of operating system 304.

File subsystem 340 provides an abstracted interface to file manipulation functions. Examples of such functions include opening and closing files, reading and writing from/to files, and deleting or naming files.

Persistent memory subsystem 342 provides an abstracted interface to persistent memory available on a gaming machine or server. In some embodiments of the invention, persistent memory subsystem 342 provides an interface substantially similar to the interface provided by file subsystem 340.

Watchdog subsystem 344 provides an abstracted interface for establishing and maintaining a watchdog component. A watchdog component is a system component that can be used to automatically detect software anomalies and reset the processor or software environment if any occur. Generally speaking, a watchdog timer is based on a counter that counts down from some initial value to zero. The software selects the counter's initial value and periodically restarts it. If the counter ever reaches zero before the software restarts it, the software is presumed to be malfunctioning and the processor or software is reset.

Timer/alarm subsystem 346 provides an interface to timer and alarm functions. In some embodiments, a list of timers is maintained. In some embodiments, when a new timer is created, it is inserted in the list of currently active timers and the list is sorted. Timers in the list are decremented, and when the timer expires a timer expired message is delivered to the process or thread that instantiated the timer. In alternative embodiments, the timer and/or alarm functions provided by the underlying operating system 304 may be used. In some embodiments, the timer expired message may be delivered through peer-to-peer messaging layer 308 described below.

Serial/stream subsystem 348 provides an abstracted interface to serial or stream input/output (I/O) functions provided by the underlying operating system.

Memory allocator subsystem 350 provides an abstracted interface to control the allocation and deallocation of memory. The memory may be physical memory such as various types of random access memory, or the memory may be virtual memory, which may be a combination of RAM and persistent memory such as a disk.

Mutex/semaphore subsystem 352 provides a common interface to mutex (mutual exclusion) and/or semaphore functions. The functions may be provided by the underlying operating system. In some embodiments, the mutex and/or semaphore functions are POSIX compliant.

Process/thread subsystem 354 provides an abstracted interface to the process and thread functions provided the underlying operating system. In some embodiments of the invention, interfaces are provided to functions that start, stop, and suspend processes and threads, get the name of a process or thread, and get an identifier (or token) associated with a process or thread. In some embodiments, the suspend interface causes a process or service to discard all messages received other than a wake-up message.

Peer to peer messaging layer 308 provides an abstracted messaging interface allowing processes and services to communicate with one another and with other components of the operating system. The processes and services may all be on one computer system, or they may be distributed among two or more computer systems that are communicably coupled via a wired or wireless network. In some embodiments, the message communication mechanism comprises a thread-safe message queue residing in shared memory belonging to the framework. In alternative embodiments, mechanisms such as pipes, sockets and mailboxes may be used instead of or in support of the message queue. In some embodiments, the peer to peer messaging layer 308 uses a socket interface known in the art as the underlying communications mechanism. In some embodiments, TCP/IP stack 310 is used to provide an industry standard mechanism to communicate message data between pairs of sockets. In alternative embodiments of the invention, messages may be sent using the UDP (User Datagram Protocol).

In some embodiments, message queues are maintained within the peer to peer messaging layer 308. A message queue may be identified based on the IP address associated with a socket. A port and subport may be used to identify the owner of the socket to be used to receive a message, with the subport being mapped to a message queue identifier.

Various mechanisms exist that may be used to make the framework components available to other software components (for example, application and plug-in software). In Microsoft Windows based environments, the framework may be provided as a Dynamic Link Library (DLL). In UNIX and UNIX-like environments, the framework may be provided as a shared object library (".so" library).

Various services may be executed on a gaming machine or server using framework 302 and communicate with one another through the framework. A service comprises at least one thread of execution that utilizes peer-to-peer messaging layer 308. In some embodiments, services are considered "opaque", that is, the service does not expose data or methods to other service. Rather, the services interact by exchanging messages through the peer-to-peer messaging layer 308. In some embodiments, a master service 322 may initiate subordinate services 320. In particular embodiments, master service 322 may be implemented as a process or executable (EXE) that executes in a protected memory space (on suitably advanced kernels). Subordinate services 320 launched by the master service may execute within the context of the master service 322.

An example of a subordinate service 320 is a plug-in service. In some embodiments, a plug-in service may be implemented in a manner that allows it to be dynamically loaded by the master service at run-time rather than being linked into the application during the build process. Examples of such mechanisms include the DLL and shared object library methods described above. Thus the plug-in may be dynamically loaded and terminated by the Master Service as required.

In alternative embodiments, each plug-in service 320 may be implemented as a separate master service that executes as a distinct process. This approach, however, may use more system resources.

Figure 3C:
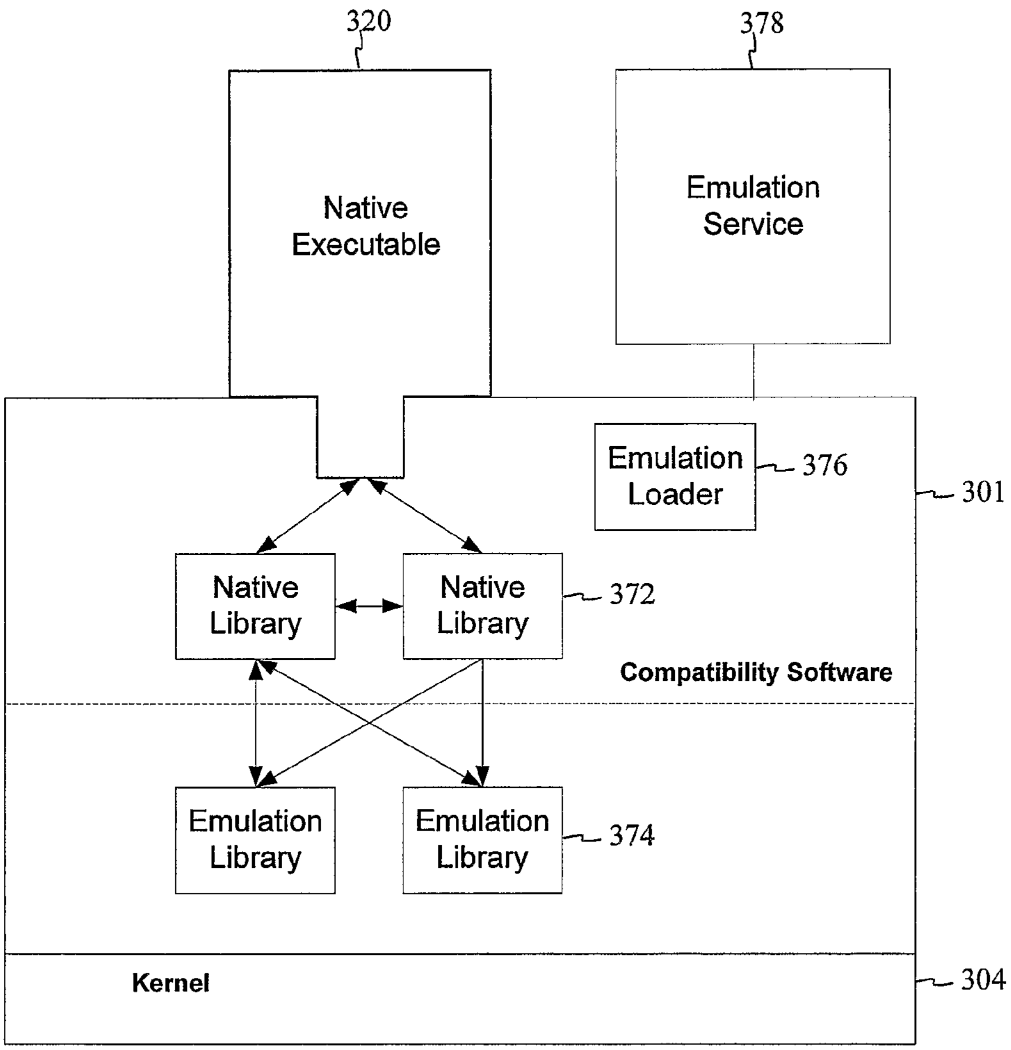
FIG. 3C is a block diagram of a compatibility including an emulator component according to varying embodiments of the invention.

FIG. 3C is a block diagram of a compatibility component 301 including an emulator component according to varying embodiments of the invention. In some embodiments, compatibility component 301 includes one or more native libraries 372, one or more emulation libraries 374 and an emulation loader 376. Native libraries 372 comprise libraries of executable functions and associated data that are built for an operating system kernel different having a different type of version than that of kernel 304. For example, in some embodiments, native libraries are built to run on Microsoft Windows based operating systems while kernel 304 comprises a Linux kernel. In these embodiments, native libraries 372 may include DLL (Dynamically Loadable Libraries) such as the GDI32 library, USER32 library, Kernel32 library, NTDLL library or other such Windows based libraries. As indicated in FIG. 3C, functions in one native library 372 may call one or more functions in another native library 372.

Emulation libraries 374 provide entry points for functions that are may be called by native libraries 372. Emulation libraries are built for kernel 304. The functions in emulation library 372 provide a mapping or translation for functions originally provided by the native operating system for libraries 372 to functions provided by kernel 304. In other words, functions in emulation library 374 emulate the functionality provided by the same function in the native operating system used to build native libraries 372 and native executable 320.

Emulation loader 376 loads native executables 320 and native libraries 372 into memory managed by kernel 304. Loader 376 understands memory reference mechanisms in application 320 and native libraries 372 and translates the reference and executable format into a format that can be managed by kernel 304.

Similar to native libraries 372, native application 320 is an application that was compiled and built to be run on an operating system having a different version than operating system 304. For example, native application 320 may be a Microsoft Windows based application while kernel 304 may be a UNIX based kernel such as Linux.

In some embodiments, application 320 may be a gaming application. In alternative embodiments, application 320 may be a gaming utility application that is not available for kernel 304, or a utility application that is required to communicate with other machines in a gaming network. For example, application 320 may be a download utility application that requires communications with other Windows based applications. Such a download utility application could be used to provide existing Windows based download protocols in a UNIX® or LINUX® environment. As a further example, application 320 may be a service providing Microsoft Windows directory related services (e.g. Active Directory) for a UNIX® or LINUX® environment.

In some embodiments, an emulation service 378 is used. Emulation service 378 controls process execution and inter-process messaging for native applications 320.

Figure 3D:
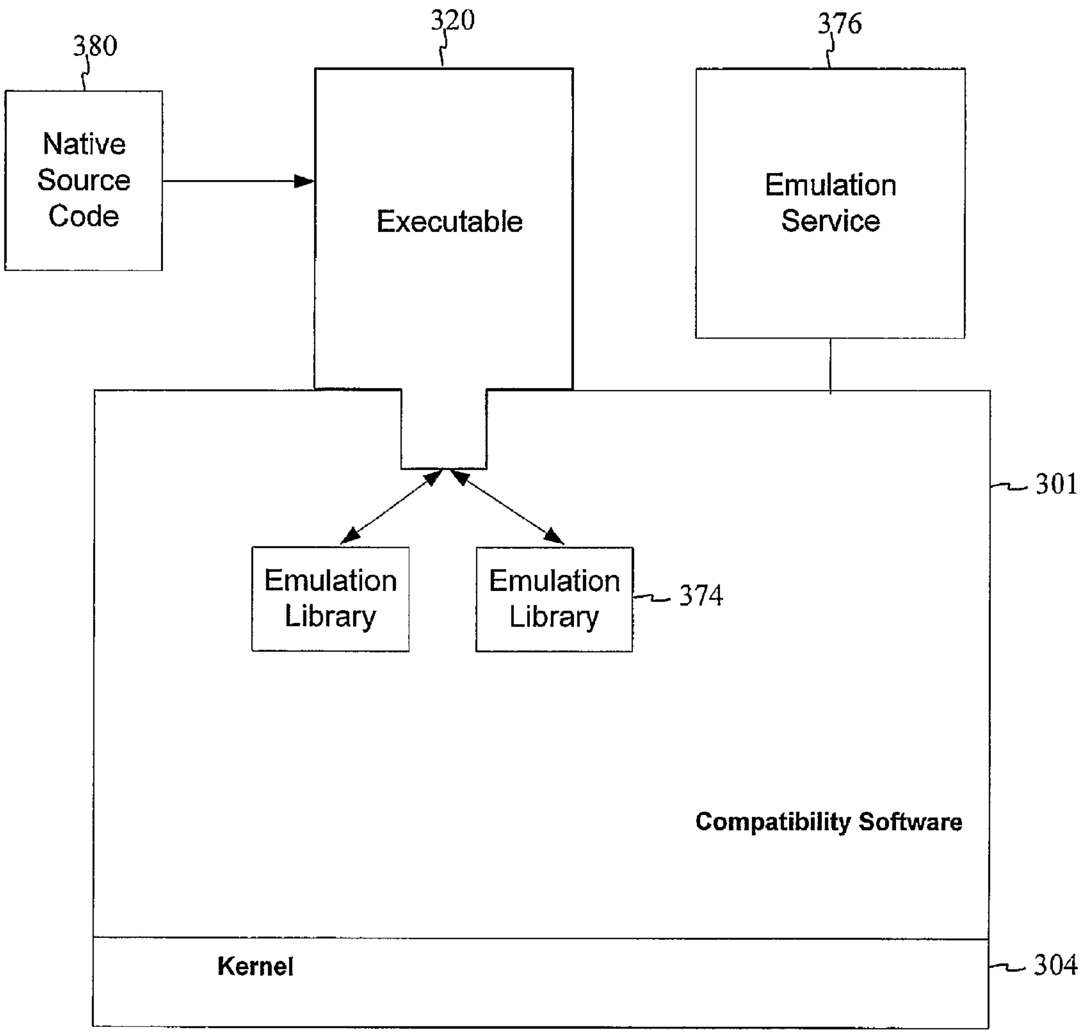
FIG. 3D is a block diagram of a compatibility including an emulator component according to alternative embodiments of the invention.

FIG. 3D is a block diagram of a compatibility component 301 including an emulator component according to alternative embodiments of the invention. In these embodiments, native source code 380 for an application written for a native operating system may be compiled and built into an executable for a different operating system (e.g. operating system kernel 304). Function references in the native source code 380 are resolved using functions in emulation library 374. As discussed above, the functions in emulation library 374 emulate the functions originally provided in the native operating system.

In some embodiments, the WINE (WINdows Emulator) may be used to provided the emulation libraries, loaders and services. WINE is available in open source form from www.winehq.com.

Figure 4:
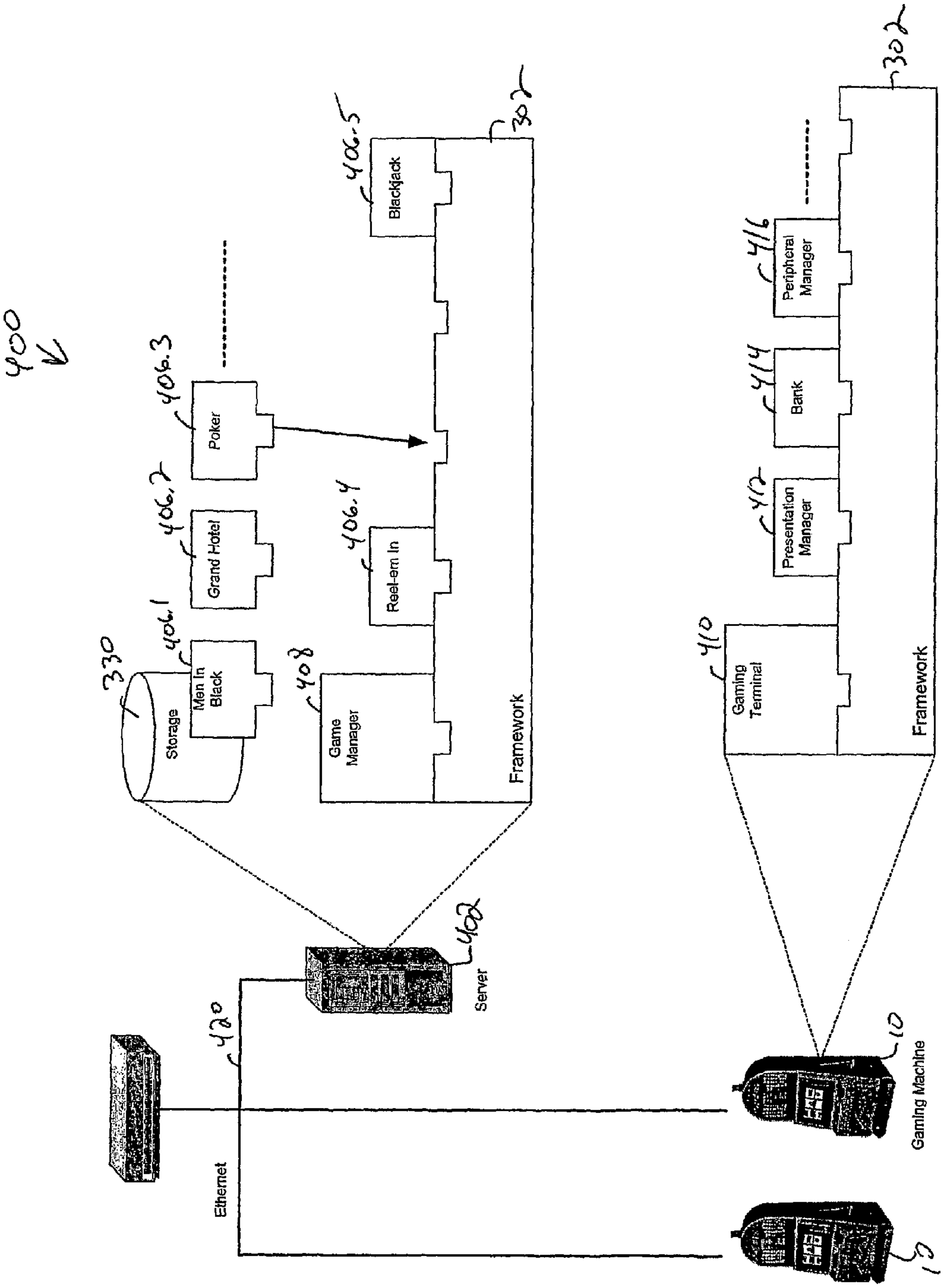
FIG. 4 is a block diagram of an exemplary system of gaming devices incorporating varying embodiments of the invention.

FIG. 4 is a block diagram of an exemplary system 400 of gaming devices and servers incorporating varying embodiments of the invention. System 400 includes gaming machines 10 and server 402 communicably coupled via a network 420. Network 420 may be wired or wireless and may comprise an intranet within a gaming establishment or company, or network 420 may be the Internet. The invention is not limited to any particular type of network 420.

Gaming machines 10 and server 402 may each provide an instance of framework 302 along with various plug-in services 406-416 that make use of framework 302. In general, plug-in services 406-416 may communicate with other plug-in services on the same machine or on other machines in a network of gaming machines and servers.

Figure 5:
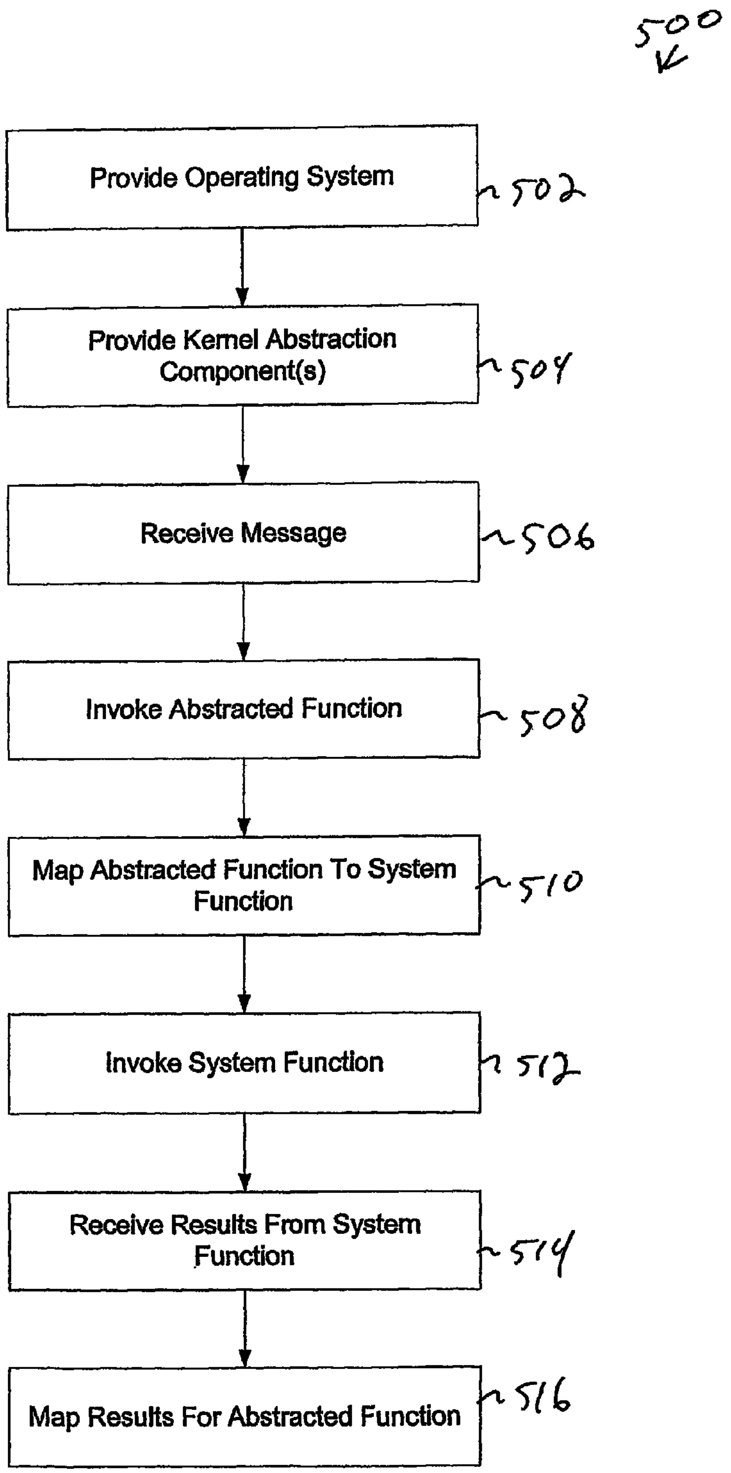
FIG. 5 is a flowchart illustrating a method for providing a kernel abstraction component according to various embodiments of the invention.

In the exemplary embodiment illustrated in FIG. 5, a game manager 408 operates as a master service on a gaming server 402 and a game terminal 410 operates as a master service on a gaming machine 10. In some embodiments, game manager 408 is responsible for cataloging, validating, launching and terminating game plug-in services. A game may be launched and terminated based on player selections or external events (such as start and end of a tournament).

Game terminal 410 application is responsible for 'assembling' the connections needed to establish a complete gaming application. In some embodiments, game terminal 410 is responsible for locating and connecting the presentation manager 412 and the game manager 408. Game terminal 410 may also answer requests for service from other plug-ins and services.

Each actual game plug-in (e.g. Men In Black 406.1, Grand hotel 406.2, poker 406.3, blackjack 406.5, Reel-em In 406.4, etc) may be distributed as a separate plug-in and each game may be sold and upgraded as a distinct product. Since each game is a separate product, new games may be deployed without altering or re-distributing the framework 302.

Because each game is a distinct service with a separate thread of execution, game manager 408 may launch multiple, simultaneous games that display on one or more gaming machines 10 in any combination.

In some embodiments, game manager 408 and game plug-ins 406 may be deployed on each gaming terminal 410. In these embodiments, game manager 408 may launch games only for presentation on the local display. In alternative embodiments, one or more game managers 408 may be deployed on central servers and may launch the games for execution on the server(s) with presentation running as a plug-in 412 running under the control of gaming terminals 410.

As shown in FIG. 4, games are not the only services that may be deployed as plug-ins. Host protocols, financial and metering engines and peripheral device services all vary from customer to customer. The use of plug-ins allows each distribution to be tailored to the meet individual customer or jurisdictional needs. For example, in some embodiments, a presentation manager 412, bank 414 and/or peripheral manager 416 may be included in the plug-ins running on a gaming machine 10. Presentation manager 412 is responsible for rendering graphics and animations and for playing sounds on a gaming machine 10.

Bank plug-in service 414 manages funding activity related to the use of a gaming machine 10 and applies banking rules for a jurisdiction. For example, bank plug-in 414 manages playable funds on the gaming machine, including whether there are sufficient funds, and whether adding additional funds would put the machine over the jurisdictional credit limit on the gaming machine 10.

Peripheral manager 416 is a plug-in service that may be used to manage peripherals on a gaming machine 10. Examples of such peripherals include bill/coin acceptors, hoppers, ticket readers, buttons etc. The inventive subject matter is not limited to any particular type of peripheral managed by peripheral manager 416.

As can be seen from the above, services may interoperate with any number of other services distributed in any arbitrary configuration. As a result, a service can present information on any arbitrary group of displays. This feature is referred to as "execute anywhere, display anywhere". As an example, a tournament game service executing on an overhead sign controller may present the game on multiple displays, which may include any combination of gaming terminals and overhead signs. As a further example, a display may interoperate with multiple local or remote services. For example, a gaming terminal can simultaneously present a video slot game that is executing locally and a communal Keno game that is executing on a central server.

FIG. 5 is a flowchart illustrating methods for providing a kernel abstraction component in a gaming machine operating environment according to an embodiment of the invention. The method to be performed by the operating environment constitute computer programs made up of computer-executable instructions. Describing the methods by reference to a flowchart enables one skilled in the art to develop such programs including such instructions to carry out the methods on suitable computers (the processor or processors of the computer executing the instructions from computer-readable media). The methods illustrated in FIG. 5 are inclusive of acts that may be taken by an operating environment executing an exemplary embodiment of the invention.

Method 500 begins by providing an operating system to control a gaming machine, gaming server, or other gaming device (block 502). As noted above, the operating system may be any type of operating system now known or developed in the future. Examples of such operating systems include the Microsoft Windows family of operating systems, variants of the UNIX operating system, Linux, Qnx, Vrtx and other such operating systems.

Next, one or more kernel abstraction components are established (block 504). The kernel abstraction components may include process/thread control components, messaging components, semaphore/mutex components, file I/O components, serial and/or stream I/O components, persistent memory components and memory allocation components. The inventive subject matter is not limited to any particular combination of the aforementioned components.

After the operating system and kernel abstraction components have been initialized, a service then receives a message related to a kernel abstraction component (block 506). Typically the message will include a message type indicating the type of request for a kernel abstraction component (or response to a previously issued request) and data related to the request such as request parameters.

The service then proceeds to invoke an abstracted function associated with the request (block 508). In some embodiments, the abstracted function may be totally implemented by the service itself. In alternative embodiments, the abstracted function will require services and functions from the underlying operating system. In these embodiments, the abstracted function is mapped to one or more operating system functions (block 510). The operating system functions are then invoked as necessary (block 512). Results from the operating system functions may be received (block 514) and mapped to results for the abstracted function (block 516).

The results of the abstracted function may then be communicated back to the requester via messaging component functions.

CONCLUSION

Systems and methods for providing a kernel abstraction component in a gaming device have been disclosed. The systems and methods described provide advantages over previous systems. For example, the framework and plug-ins of various embodiments provide the opportunity to assemble a product using the framework and a number of much smaller plug-in components rather than a large monolithic product.

Additionally, in some embodiments, each plug-in may be built and versioned as a separate small product, which allows it to be maintained and distributed as an independent entity. Further, the use of plug-ins also allows specific features or games to be distributed as independent entities and allows new features and new games to be added to existing Gaming Terminals.

Thus, a common framework and a set of plug-in components may be deployed in a wide variety of configurations giving the manufacturer the ability to respond to diverse customer requirements in a flexible and efficient manner.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A gaming machine comprising:

a processor and a memory;

a presentation manager;

a game terminal application configured to connect the presentation manager with a game manager on a gaming server, wherein the game manager is configured to execute a game on the gaming server and the presentation manager is configured to render the executed game;

an operating framework including:

an operating system kernel loaded from the memory and executed on the processor and having a version and providing a set of operating system services; and a compatibility component providing an interface to a set of one or more services that are translated to one or more of the operating system services, the compatibility component including:

a kernel abstraction component providing an abstracted service, the abstracted service providing an interface to at least one of the operating system services, wherein said interface is independent of the version of the operating system kernel and wherein the presentation manager and game terminal application are configured as plug-ins to the operating framework.

2. The gaming machine of claim 1 and further comprising a messaging component operable to send and receive messages between the abstracted service and a gaming service.

3. The gaming machine of claim 1 wherein the abstracted service comprises a process subsystem.

4. The gaming machine of claim 1 wherein the abstracted service comprises a file subsystem.

5. The gaming machine of claim 1 wherein the abstracted service comprises a persistent memory subsystem.

6. The gaming machine of claim 1 wherein the abstracted service comprises a watchdog subsystem.

7. The gaming machine of claim 1 wherein the abstracted service comprises a timer subsystem.

8. The gaming machine of claim 1 wherein the abstracted service comprises a serial or stream input/output subsystem.

9. The gaming machine of claim 1 wherein the abstracted service comprises a memory allocator subsystem.

10. The gaming machine of claim 1 wherein the abstracted service comprises a semaphore subsystem.

11. The gaming machine of claim 1, wherein the compatibility component comprises an emulator for a second operating system, the emulator operable to provide an environment for an application built for the second operating system to be executed by the operating system kernel.

12. The gaming machine of claim 1, wherein the compatibility component comprises an emulator for a second operating system, the emulator including one or more libraries having interfaces specified by the second operating system and operable to translate a call to the interface specified by the second operating system to an interface provided by the operating system kernel.

13. A method comprising:

providing, in a gaming device, an operating framework;

executing a presentation manager of the gaming device as a plug-in to the operating framework;

operating a game terminal application of the gaming device to connect the presentation manager with a game manager of a gaming server, the game manager configured to execute a game on the gaming server and the presentation manager configured to display the executed game on the gaming device;

providing, in the operating framework an operating system kernel having a version, wherein the operating system kernel includes a set of one or more system services comprising one or more system functions;

providing, in the gaming device, an abstracted service, wherein the abstracted service includes a set of one or more abstracted functions that are independent of the version of the operating system kernel.

14. The method of claim 13, further comprising receiving a message identifying the abstracted function and a set of one or more parameters for the abstracted function.

15. The method of claim 13, further comprising receiving a result from the one or more system functions and mapping the result to an abstracted function result.

16. The method of claim 13, wherein the abstracted service comprises a process subsystem.

17. The method of claim 13, wherein the abstracted service comprises a file subsystem.

18. The method of claim 13, wherein the abstracted service comprises a persistent memory subsystem.

19. The method of claim 13, wherein the abstracted service comprises a watchdog subsystem.

20. The method of claim 13, wherein the abstracted service comprises a timer subsystem.

21. The method of claim 13, wherein the abstracted service comprises a serial or stream input/output subsystem.

22. The method of claim 13, wherein the abstracted service comprises a memory allocator subsystem.

23. The method of claim 13, wherein the abstracted service comprises a semaphore subsystem.

* * * * *

UNITED STATES PATENT AND TRADEMARK OFFICE
CERTIFICATE OF CORRECTION

PATENT NO. : 8,544,001 B2
APPLICATION NO. : 11/570407
DATED : September 24, 2013
INVENTOR(S) : Gagner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1777 days.

Signed and Sealed this
Fifteenth Day of September, 2015

Michelle K. Lee
*Director of the United States Patent and Trademark Office*